United States Patent

[11] 3,528,424

[72] Inventor  Waldemar A. Ayres
                401 Park Ave., Rutherford, New Jersey
                07070
[21] Appl. No. 616,959
[22] Filed     Feb. 17, 1967
[45] Patented  Sept. 15, 1970

[54] LASER SURGICAL KNIFE EQUIPMENT
     15 Claims, 10 Drawing Figs.
[52] U.S. Cl. .................................................. 128/303.1,
                                                         331/94.5
[51] Int. Cl. .................................................. A61b 17/36
[50] Field of Search ...................................... 128/303.1,
                395, 22; 331/94.5; 88/14; 350/301, 50—52

[56]                    References Cited
                  UNITED STATES PATENTS
1,828,924  10/1931  Chardell et al. .............  350/301
2,963,942  12/1960  Montremy ....................  350/52X
3,216,317  11/1965  Nail ..............................  88/14X
3,315,680   4/1967  Silbertrust et al. ............  128/395
3,348,547  10/1967  Kavanagh .....................  128/395

Primary Examiner—L.W. Trapp
Attorney—Kane, Dalsimer, Kane, Sullivan and Smith

ABSTRACT: A closed conduit system for conducting energy, particularly laser light energy, from a source to a hand manipulatable instrument. The system includes plural elongated conduits connected at their ends with articulatable joints to allow that adjacent conduit sections are movable with respect to one another. The joints carry reflecting surfaces that are mounted to insure that the laser beam is conducted along the axis of the system to the instrument which optically focuses the beam longitudinally thereof. By the articulatable joints the focused beam may be readily moved to any point in space within three mutually perpendicular planes for use, for example, in surgical procedures.

Patented Sept. 15, 1970
3,528,424
Sheet 1 of 3
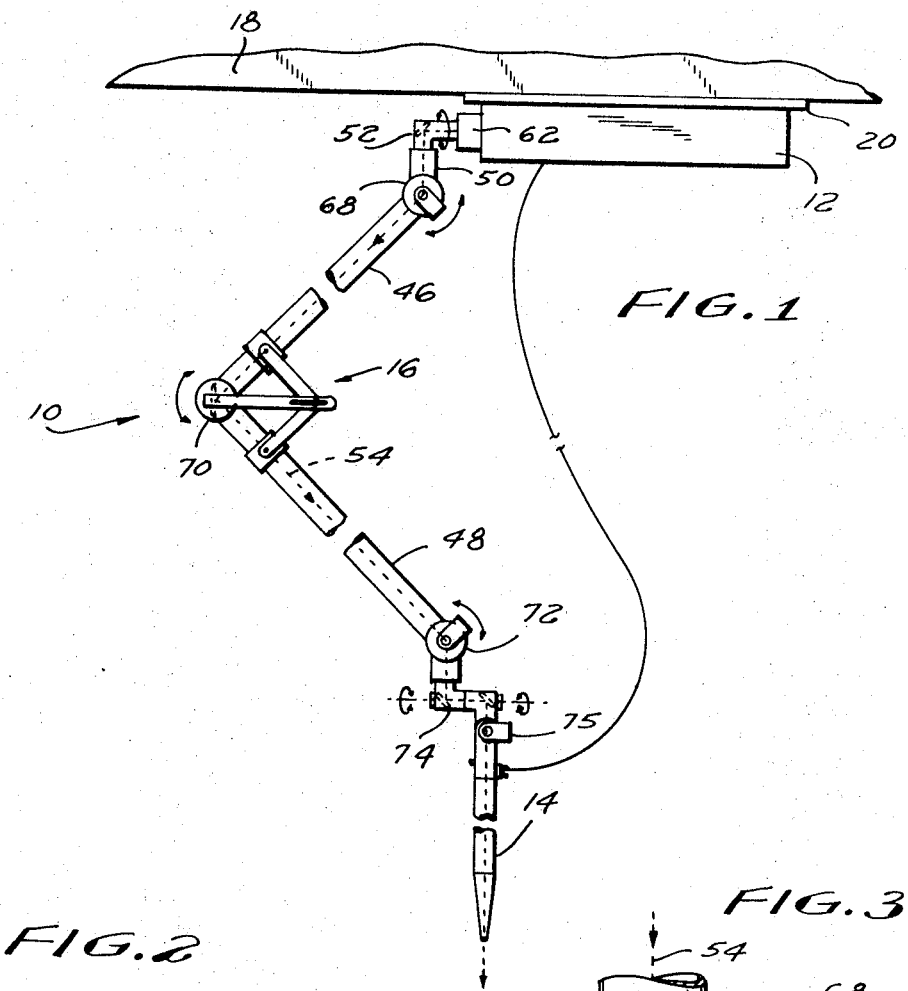
FIG.1
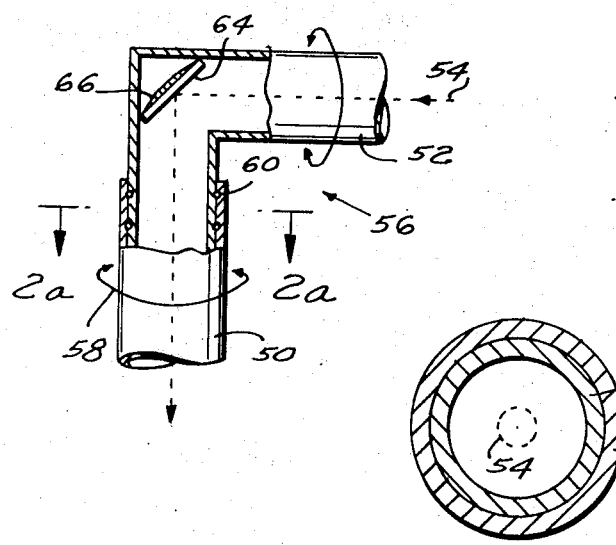
FIG.2
FIG.2a
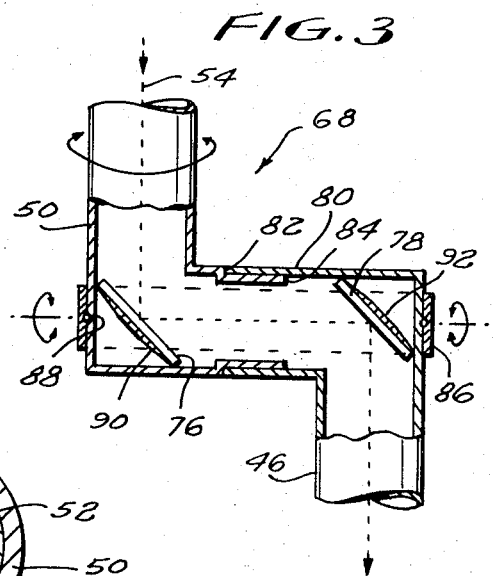
FIG.3
INVENTOR
WALDEMAR A. AYRES
BY
Kane, Dalsimer, Kane, Sullivan & Smith
ATTORNEYS

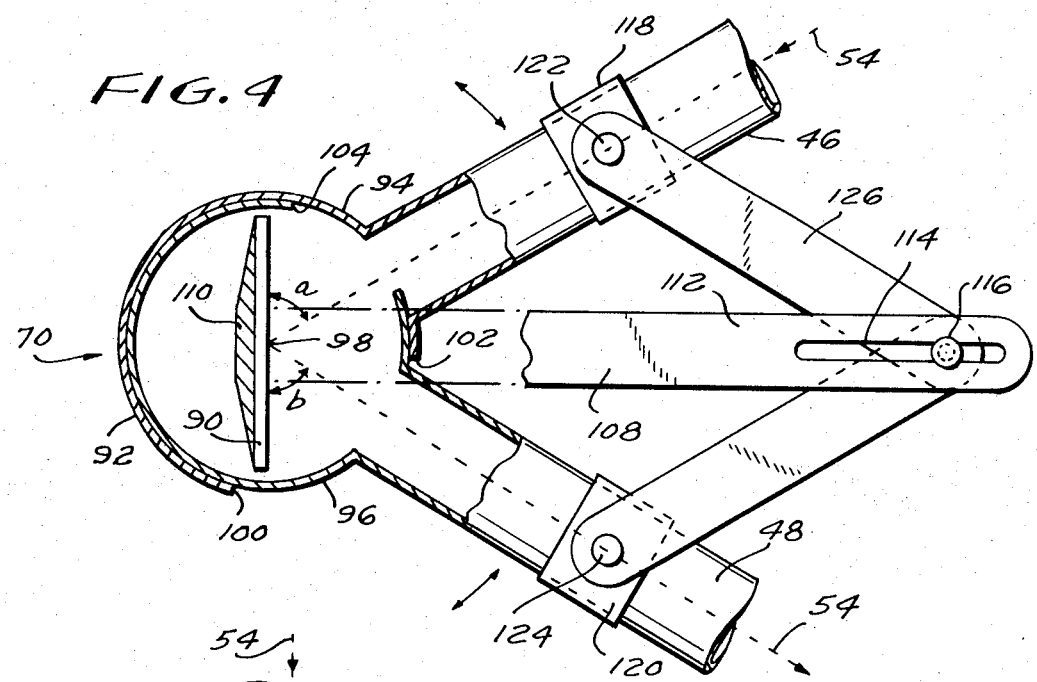
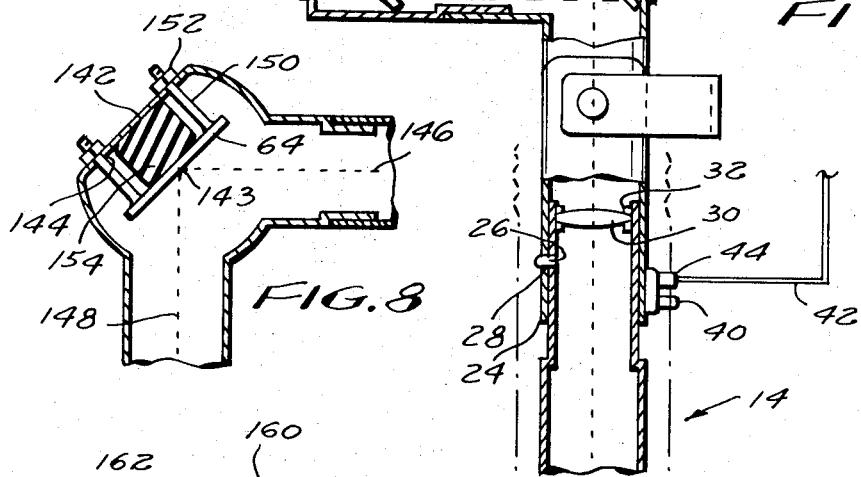
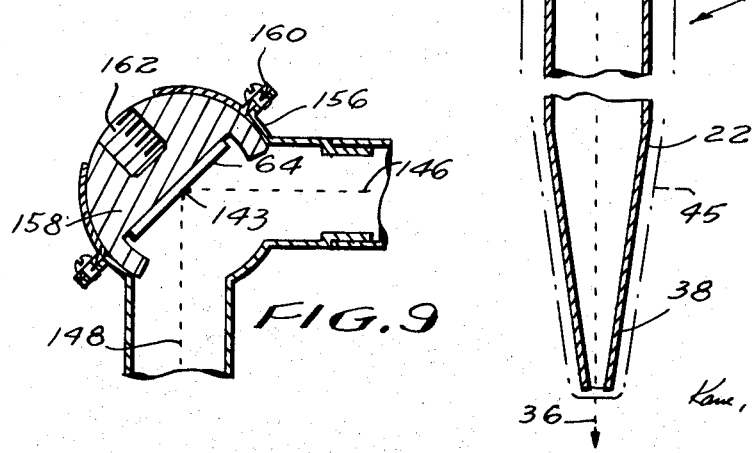

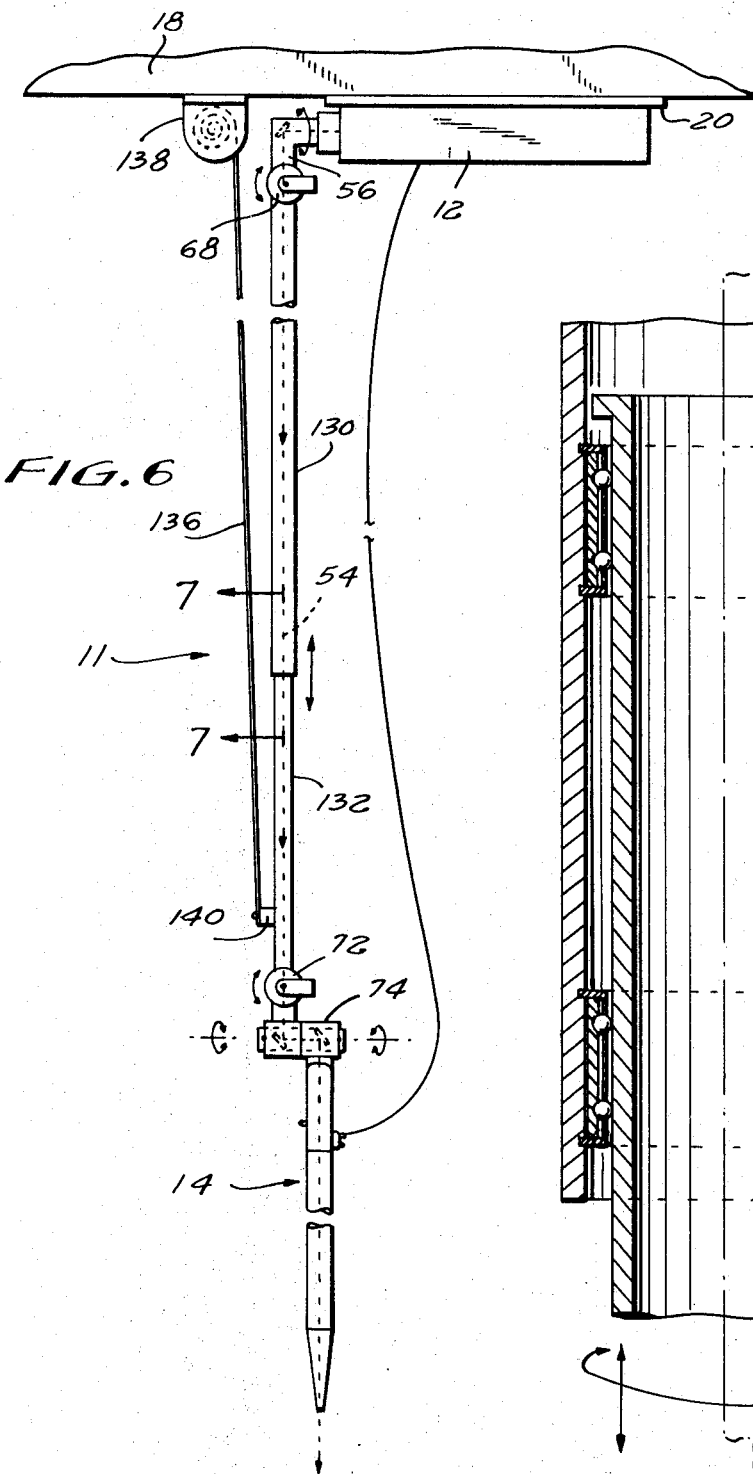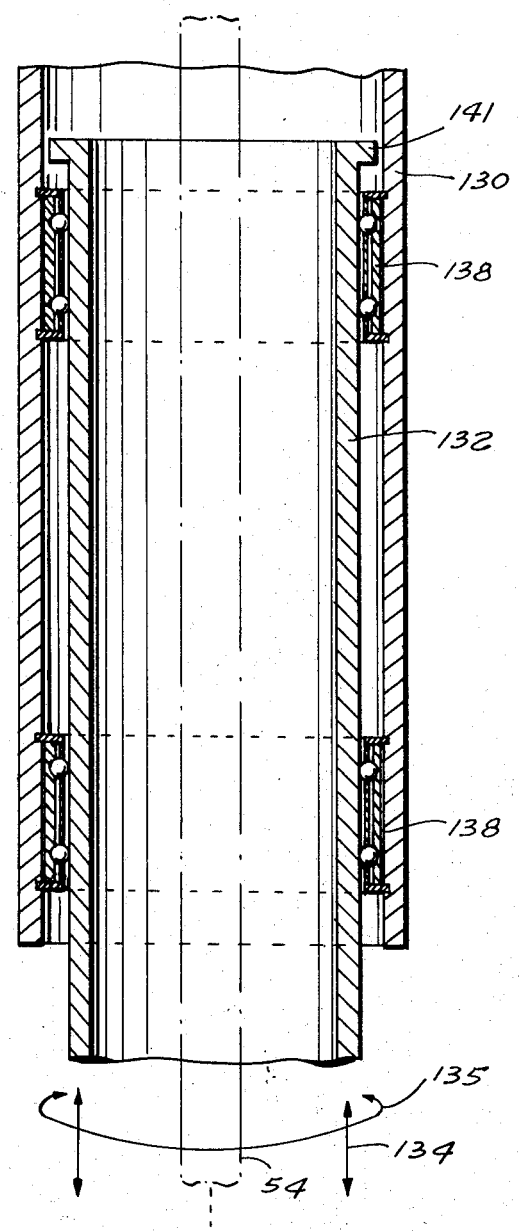

3,528,424

LASER SURGICAL KNIFE EQUIPMENT

BACKGROUND OF THE INVENTION

This invention relates to the conduction through a closed system of conduits of a laser beam from a source to a point of focus and particularly to a system having means to allow the point of focus to be moved in space within three mutually perpendicular planes.

Subsequent to the development of the laser, among other uses the application of beams developed by various sources of laser energy has been directed to surgery and the treatment of cancer. This application has acquired widespread attention.

While the use of laser concentrated beams in surgery and cancer is known a major problem exists in providing a method and apparatus whereby the beam from a laser generator, generally fixedly located, may be conducted to a beam focusing instrument capable of being grasped and freely moved by the hand to any position in space and particularly to a body part of a patient. This movement should be carried out almost as readily as the hand could move a scalpel to any position in space.

To date this major problem has not been overcome. Attempts have been made whereby double gimbal mirrors are employed to deflect a laser beam either to a desired location or a long a predetermined path. Without extensive training the attempts have not met with much success since this particular manipulation of mirrors to move a beam is an unnatural activity and therefore one of great difficulty. A prime cause of this difficulty may be that for any angular deflection of the reflecting surface the beam undergoes a deflection twice as great. Therefore, it becomes necessary to coordinate the angular movement of the reflective surface with the movement that the beam is desired to undertake.

SUMMARY OF THE INVENTION

Broadly the invention is directed to a plurality of interconnected conduits connecting a laser generator to a hand manipulatable instrument thereby to conduct a laser beam from the former to the latter through a closed system. The conduits are connected by joint structure carrying internally thereof a reflecting surface, which at all times and irrespective of joint articulation is so oriented that an incident laser beam travelling along the longitudinal axis of one conduit is reflected to pass along the longitudinal axis of an adjacent conduit thereby to pass into the manipulatable instrument capable of freely moving in space. The instrument carries optical means for focusing the laser beam at a predetermined axial location in front of the distal end whereby the laser beam, due to joint articulation and freedom of instrument movement within three mutually perpendicular planes, is used in surgical procedures.

In view of the foregoing the invention uniquely overcomes the problems and disadvantages brought out and the principle object, the provision of a conduit system connecting a stationary laser source to a hand grasped instrument whereby a laser beam is conducted to the hand grasped instrument for focusing and directing the beam to a body area within which surgery is being performed, is derived.

A further object is to provide a system as described wherein the conduit structure is capable of articulating in a manner that the hand grasped instrument is efficiently, conveniently and readily moved toward and away from any spatial location within three mutually perpendicular planes.

Other objects and advantages of the present invention will readily come to mind during the course of the following discussion.

DESCRIPTION OF THE DRAWINGS

The accompanying drawings illustrate the present invention.

By these drawings:

FIG. 1 shows the surgical assembly including a laser beam generator and a hand manipulated scalpel-like member or stylus for focusing a laser beam together with conduit means for conducting the laser beam, within a closed system, from the generator to the stylus which may be moved to any location desired thereby to impinge the focused laser beam at a given point;

FIGS. 2, 3 and 4 are enlarged views, partially in cross-section, of the joints as shown in FIG. 1;

FIG. 2a is a view in cross-section taken along the line 2a—2a in FIG. 2, showing the laser beam to be coaxially oriented with respect to the concentrically counted conduits;

FIG. 5 is an enlarged view, in cross-section, of the stylus as shown in FIG. 1;

FIG. 6 is an assembly view similar to FIG. 1 yet showing a second form of the invention;

Fig. 7 is a view in cross-section taken along the line 7—7 in FIG. 6 showing a further form of joint for connecting a pair of conduit members; and FIGS. 8 and 9 show in cross-section possible structures for mounting and properly orienting a reflective surface within a connecting joint.

DESCRIPTION OF THE PREFERRED EMBODIMENTS

Referring initially to FIG. 1 the complete assembly defined by the present invention is represented by the numeral 10. Broadly, the assembly includes a laser generator 12, a scalpel-like member or stylus 14 capable of focusing, by the incorporation of optical structure, a laser light beam at a desired location for cutting or irradiating animal or human tissues, and conduit means indicated by the numeral 16. The conduit means 16 connects the stylus to the generator and comprises a plurality of elongated conduit members and conduit connecting members or joints. The joints, as will be discussed in detail, are so designed and oriented to provide that the optical axis of the laser beam remains coaxial with the axis of the conduit members and stylus for proper focusing. Similarly important, the joints permit stylus movement in any desired direction and to any desired point in space within the desired operating area. The stylus can also be held in any desired attitude, for comfort, minimum fatigue, and for maximum precision of manipulation.

The structure and operation of the laser generator per se forms no part of the present invention. Therefore, a detailed discussion is considered unnecessary. What should suffice for the purpose of the present description is that, subject to the particular operation characteristics desired, any one of the many known types of laser generators may be used with the structure to be described. Thus, within the context of the present invention, the surgical application will determine the type of laser to be used.

As shown in both FIGS. 1 and 6 the laser generator is mounted on a surface 18 by means of a mounting plate 20. Mounting may be accomplished in accordance with known techniques. While, as shown in the figures, the laser generator may be permanently mounted on the ceiling of an operating room so that it is removed from the operating table it should be apparent that the generator may otherwise be located, for example, on the floor adjacent the operating table or on a table supplied with casters for movement, as desired.

The stylus 14, best shown in FIG. 5, is of an elongated pencil shaped configuration. It may be similar to a surgeon's scalpel. Due to this configuration the stylus is easily gripped and manipulated.

The stylus is of two piece construction and includes a first part 22 that is removably received either within or in surrounding relation to a second part 24 as determined by design considerations. These parts may be interconnected in any manner and by any means keeping in mind that a coaxial relationship between parts must be maintained. For the purpose of example the first part 22 is slidably and telescopically received within the second part 24. Preferably, a friction fit should result. Additionally, and to insure that the parts remain in their assembled relation, a bayonet lock or a conventional pin or socket arrangement may be resorted to. Thus, pin 26 connected to the removable stylus section and biased radially outwardly (resilient means not shown) lockingly interacts with an aperture 28 formed in the upper or stationary stylus section. By provision of structure (not shown) or descriptive indicia the replacement section 22 may be oriented with regard to section 24 so that the former may be mounted on the latter. Since the stylus is not an integral unit many and varying stylus replacement units may be used, giving versatility to the system.

Each unit will be characteristically suited for a particular surgical usage. Various considerations, such as, the desired focusing cone characteristics, the beam dispersion characteristics or the type of focus, be it line focus or round spot focus may determine the stylus to be used. The focusing characteristics affect the power level, generally indicated by the ratio watts/sq cm, and therefore, the type of focus may become important in a particular usage. Many factors are to be considered in choosing a proper stylus thereby to perform a desired operation.

Versatility is built into the apparatus by providing a different lens 30 with each replacement section 22 of stylus 14. Lens 30 may be mounted within section 22 in any convenient manner. As shown in FIG. 5 the lens is mounted adjacent the upper end 32. While only a single lens is shown it is to be understood that, as desired and if suitable, multiple lenses may be employed. Irrespective of the number and type of lens employed its function is to focus at some point removed from the distal end 34 of the stylus 14 the columnated laser beam that is conducted to the stylus by the structure to be described. It may be desirable to focus the beam to an intense cross-section (perhaps a millimeter in diameter). The direction to the focal point is indicated by the arrow 36 and as may be apparent, the stylus is movable toward and away from the work area to defocus the beam thereby to increase the spot area or decrease the spot intensity.

In the region of the distal end 34 the stylus is tapered at 38. The tapering angle of each replacement unit is matched to or represents the particular optical unit carried by the removable stylus part. The operator or surgeon therefore can easily determine the focal point and the maximum power point of the laser beam even before the laser is turned on. This is an extremely important consideration particularly when working with laser sources that develop a beam which cannot be seen (infra-red or ultra violet) or cannot readily be seen by the human eye. Thus, the surgeon may position his hand and stylus for the result desired while the laser unit is inoperative.

The stylus part 24 carries a switch 40 which may be of the pressure type for ON-OFF control of the laser generator. It is an important convenience to have the ON-OFF control at the surgeon's fingertips, and this is particularly the case when the generator, as graphically represented by the figures, is mounted at a remote point, such as, on the ceiling. Thus, the generator may be controlled as the stylus is held and moved within the working area. As shown in FIG. 5, switch conductors 42 carrying a pair of female connectors 44 are rigidly supported by stylus part 24. In this manner an electrical extension (not shown) may be plugged into the stylus 14 for remote ON-OFF control of the laser generator.

The stylus unit 14 and, for that matter, the entire laser conducting assembly is formed to completely enclose the laser beam throughout its passage from the source to the stylus. That the system for conducting the beam is a closed system is of utmost importance since the hazard to sight, in an open system, is great and maximum protection must be afforded to the eyes. Laser light beams are characteristically highly coherent and columnated. Danger develops from the fact that the human eye tends to focus parallel oriented beams at the retina. Protection to the eyes of the surgeon as well as those persons in the room is afforded by the closed system, since stray portions of the beam may not escape.

For the sake of example and not to limit the scope of the invention, the stylus may be of a laminated construction. Thus, it may have an inner metal shell with a low heat conducting outer layer thereby to assure that the instrument will remain comfortably cool in the surgeon's hand. Theoretically, there should be no heating whatever of the stylus.

The stylus is provided with an antiseptic plastic covering which is shown phantomly surrounding the stylus at 45. Such a covering may be of any desired shape or form, etc., and may be slip-fit over the stylus. Therefore, the necessity of sterilizing the stylus which, in all likelihood, will have been very close to the patient's open wound is obviated. Thus, the sterility provided by covering 45 will comply with hospital regulations requiring that all apparatus and equipment which is movable to a position above the operating table be in a sterile condition.

Returning to FIG. 1, the conduit sections are indicated at 46 and 48. While only two sections are shown in the figure, it should be understood that additional similar conduits may be provided, if desired. With the assembly of FIG. 1 and the particular connecting units that are used, a minimum of two conduits is required so that the stylus 14 is capable of movement to any location within three mutually perpendicular planes.

As noted above, the conduits define a part of the closed system and in a manner similar to the stylus may be formed of a light weight metal, such as aluminum. Aluminum will provide a highly reflective internal surface to reduce any heating from stray light, such as might be caused by slight misalignment of any one of the reflective mirrors, discussed below. The conduits 46 and 48 are elongated and, in the preferred embodiment, are cylindrical in cross-section. The particular length of each conduit section is determined by choice although partially dictated by environmental considerations within the locale of usage. Further, while a conduit of cylindrical cross-section is preferred obviously, sections not adapted for rotation in relation to adjacent sections may be of any desired shape.

The preferred form is shown in FIG. 2a. The figure indicates two coaxial conduit portions 50 and 52. As shown, the inner conduit 52 supports for rotation upon suitable bearing means (FIG. 2) the outer conduit 50. A laser beam 54 is shown within the conduits. The beam has an axis of longitudinal transmission which corresponds with the longitudinal axis of the entire laser beam conducting structure. The size of the beam in relation to the size of the conduits is not considered to be to scale.

Conduits 50 and 52 define a first rotatable joint 56. This joint is shown in FIG. 2 and may generally be referred to as a 90° elbow with a 45° reflector and rotatable outer sleeve. Therefore, indicated by the arrow 58, the outer conduit is capable of rotary movement relative to the inner conduit 52 that is, itself, rotatably mounted to a projecting collar 62 of the laser generator 12. For ease in movement suitable bearing structure, represented at 60, is provided. Bearings allowing this movement are well known in the art and further discussion is considered unnecessary.

An optical reflector 64 is stationarily mounted in the conduit 52. The mounting structure is generally indicated at 66 and may be of the type as shown in FIGS. 8 and 9, discussed below. As shown, the reflector 64 is mounted at the optical axis and in a position at the intersection of the longitudinal axes of conduits 50 and 52. In this manner the angle between the incident and reflective angle defines a right angle so that the beam, after reflection, continues its travel along the axis of conduit 50.

Many forms of reflective optics are known in the art. In the preferred embodiment it is contemplated that reflective optics will be used since reflective optics are more broadly capable of handling a wide range of wavelengths with the smallest amount of loss. Thus, for a particular laser generator wavelength the type or characteristics of the optical reflector being used, even though the generator is capable of changing, within certain limits, its wavelength is important if high efficiency is not to be sacrificed. Actually, reflectors may be made so that, for a particular wavelength, surprisingly high efficiency may be achieved. Specifically, the efficiency of one particular reflector chosen for one particular wavelength may approach 99.0 percent efficiency. In this invention all reflective units are considered to be of the high efficiency type.

Returning to FIG. 1, the conduit connecting joints 68, 70, 72, 74 and 75 are broadly shown. By means of these joints and the previously discussed joint 56, the operator or surgeon is able, by proper joint articulation, to move the stylus member in any direction and to any location in space. It is this feature which so readily adapts the assembly and laser beam for use in surgery.

FIG. 3 is an enlarged view of rotary joint 68. Additionally, it is a showing of joints 72, 74 and 75. Since all the joints 68, 72, 74 and 75 are of identical construction, only joint 68 will be considered.

As is evident the rotary joint 68 interconnects the conduits 50 and 46, permitting the same to rotate relative to one another about the optical axis between the reflectors 76 and 78. Rotation is in the direction of arrow 80. The conduits, as may be apparent may be rotated to assume any desired relative angular displacement.

A 90° elbow is formed in one end of each conduit 46 and 50. Additionally, the same end of conduit 50 is displaced toward the axis a distance substantially equal to the gauge of the conduit wall to provide a shoulder 82 and an annular surface 84. In this manner the conduit portions may be telescopically received on one another. Freedom of rotary motion may be provided by bearing means (not shown) between the surfaces. In addition to the telescopic fit the respective conduit sections may be fastened together by a spring clip 86 carrying one or more protuberances. The protuberances coact with an equal number of dimples, acting as pivot elements and correspondingly located on the conduit wall, as at 88. Alternatively, the rotatable reflector housings of the optical joint may be held together by any preferred suitable means other than a spring clip and pivot elements.

Reflectors 76 and 78 are positioned and maintained at a 45° angle within the elbows by supports 90 and 92. The support structure may be as described in relation to FIGS. 8 and 9 or any other mounting as may be preferred. Here again the mounting position of the reflectors is such that the optical axis of the laser beam is along the longitudinal axis of the conduits and elbows and irrespective of the relative angle between the telescopically received elbows, the beam both enters and leaves the joint along its axis.

As may be apparent from the figures, the spring clip is of a U-shaped configuration. The clip is mounted in a position such that the protuberances and dimples 88 lie on the axis of the elbows. In this manner there is no rotary torque applied about an axis transverse to the optical axis between the conduits. Thus, the otherwise relatively tight telescopic fit is retained by the spring clip 86.

A joint or pivoted elbow joint 70 is shown in FIG. 4. Unlike the joints as previously discussed the reflective surface 90 is mounted in a manner such that, for any movement of the legs or conduit sections 46 and 48 to increase or decrease the angle of separation therebetween, the reflective surface will automatically be tilted to a new position so that, in accordance with the known principle that the reflective angle of incidence equals the angle of reflection, the laser beam 54 initially travelling on the axis of conduit 46 will be reflected so as to leave surface 90 and travel along the axis of conduit 48. The respective angles are indicated as *a* and *b*.

Movement of the reflector will take place irrespective of changes of angular position of the conduits 46 and 48.

As shown in FIG. 4, the front reflective surface 90 is enclosed within a circular elbow housing 92. One half of the housing, part 94, is connected in any suitable manner, such as by a threaded connection, to conduit 46. In a similar manner the other half 96 is connected to conduit 48. The elbow housing sections are nested within one another and are capable of pivoting about an axis which is transverse to the optical axis yet intersects the latter at a point 98. Point 98 is coincident with the laser beam center where this center impinges on the front surface of reflector 90.

To provide the maximum pivotal movement of the conduits 46 and 48 around axis 98 the housing sections 92 and 94 are provided with a pair of ports or openings. The ports are defined by the arcuate openings extending between end surfaces in housing portions 94 and 96. The end surfaces are, respectively, surfaces 100—102 and 104—106.

So that reflecting surface 90 is automatically movable, thereby functioning as described, the reflector is mounted upon the support 108. Support 108 is generally of T-shaped construction and is pivoted at a point (not shown) above the mirror. The support upper section 110 mounts the reflector so that the surface is at an angle of 90° to the axis of the elongated leg 112 extending from housing 92. A slot 114 is provided adjacent the end of leg 112 opposite the mount and within the slot, free to move to the right or left in FIG. 4, is a pin 116. The pin has a flattened head and is thereby captive within the slot. The structure for automatic movement of the reflector 90 also includes a pair of members 118 and 120 that are fixedly connected to the conduits 46 and 48, respectively. The members support pivot pins 122 and 124 which are equidistant from the center of the reflective element. A pair of floating links 126 and 128 are connected between the pivot points 116, 122 and 124 so that upon angular movement of the conduits 46 and 48 in relation to one another, the pivot connecting links 126 and 128 move within slot 114. Such movement insures that the axis of arm 112 always bisects the changing incident and reflective angle, and with the minor always being at 90° to leg 112, the laser beam will be reflected down the axis of conduit 48.

Having now an understanding of the motion capability of the various connecting joints, reference to FIG. 1 and the various directive arrows should make it clear that the stylus is freely capable of moving to any point within the operating area. This capability is determined by the manner in which the joints articulate and the freedom is obtained through the use of precision fitting and bearing elements.

A second form of the invention is shown in FIG. 6. This form is very similar to the form disclosed above and likewise allows the stylus 14 to move in any direction to any desired spatial position within the operating area.

As is evident from FIG. 6, the assembly 11 includes a laser generator 12 and a stylus 14, as previously discussed. The connecting joints 56, 68, 72 and 74, at the end juncture of the conduits, adapting the stylus for the motion discussed above, are also as described. The difference in this form resides in the construction of conduits 130 and 132. Thus, in FIGS. 6 and 7 it is seen that these conduits are telescopically received and adapted for both relative longitudinal and rotational movement. Such movement is indicated by the direction arrows in FIG. 7.

With continued reference to FIG. 6 the assembly includes a spring member 136, connected between the ceiling and conduit 132 by suitable connections 138 and 140. The spring is provided to oppose, due to the weight of the structure supported, movement of conduit 132 from an adjusted position to its extended extreme. A similar spring (not shown) supports the structure of FIG. 1. The preferred type of spring is a cable type Negator spring, a product of Hunter Spring, ado Ametek, Inc., Hatfield, Pennsylvania. Springs of this type are well known in the art and therefore, a full discussion is not considered to be necessary. Generally, though, springs of the type contemplated will counterbalance the forces developed by the assembly weight with an equal and opposite force. Further, the spring forces do not increase with extension. For a full discussion of this type of spring reference may be had to "The Theory and Design of Long-Deflection, Constant Force Elements," Paper No. 51—F—11 from "Transactions of ASME."

FIG. 7 is an enlarged sectional view of conduits 130 and 132. As is apparent by directional arrows 134 and 136 the inner conduit is movable relative to the other conduit both rotationally and longitudinally. To provide for the relative ease in motion, bearings 138, which may be of any acceptable type for the motion desired, are provided between the walls of the conduits. Bearing structures and their operations are well known to those skilled in the art and there is not considered to be a need for further discussion.

One additional feature of note is the flange 141 provided at the upper end of conduit 132. This flange prevents the inner tube from telescoping out of the outer tube by interacting with stop 145. A similar flange and stop is provided at the lower end of the conduit and functions in a manner such that the inner conduit may not telescope within conduits 130 beyond a predetermined point. Stops of this type are well known.

As discussed the reflective surfaces, for example, surface 64 (FIG. 2), may be mounted in a manner, such as shown in FIGS. 8 and 9. In the figures, the conduits terminating in the joint are considered descriptive of all adjacent conduit sections joined as described above.

In FIG. 8 the rear wall 142 is provided with a plurality of apertures 144 arranged in quadrature. Each aperture, as will be explained, is of relatively greater diameter than the bolts to be passed therethrough. The loose fit, therefore, will permit adjustment of the reflective surface about and toward and away from point 143. In this manner the optical axis of the surface 64 may be made to coincide with the point intersection 143 of incident beam 146 and reflective beam 148.

In both figures, the enclosed angle between beam paths 146 and 148 is a right angle. In addition to positioning the optical axis of the surface at the point intersection the front face of reflector 64 must also be located in a plane perpendicular to the plane bisecting the enclosed right angle. Therefore, the latter adjustment is provided by mounting the reflector on a plurality of bolts 150 which pass through apertures 144. Bolts 150 are threaded at their ends to receive nuts 152. If required one or more lock washers may be located over the aperture to maintain proper reflector adjustment. A compression member 154 is provided and supported intermediate the reflector 64 and surface 142. Therefore, by suitable tightening of one or more nuts 152 the reflector may be rotated, by a small amount, around the point intersection 143 to equalize the incident and reflective angles.

FIG. 9 generally shows a ball and socket arrangement whereby the reflector 64 may be rotated, again by a small amount, about point 143, for the discussed purpose. The socket is indicated at 156 and the ball 158. As shown, the reflector is mounted on the ball 158 and once properly oriented the positioning is maintained by the tightening structure 160.

Ball 158 may be provided with a cut-out 162 capable of receiving a rod-shaped tool (not shown) for adjustment of ball 158 and reflector 64 relative to socket 156.

While the foregoing mountings may be used mounting by other acceptable practices may be resorted to. Further, the mountings as shown in FIGS. 8 and 9 are not intended to supplant the particular mounting for reflector 90 in the pivoted joint 70. Mounting in the latter case must allow for reflector movement in accordance with conduit separation whereas the mountings of FIGS. 8 and 9 are suitable for use in the rotatable joints of FIGS. 2 and 3, only.

I claim:

1. A closed system capable of conducting efficiently a coherent and collimated laser light beam emanating from a laser generator through the spatial distance from the source to a patient whereby the laser light beam may be used in surgical applications comprising an instrument adapted to be held in the hand thereby to direct a focused laser beam, an optical system carried by said instrument for focusing the laser beam near the instrument end, and means connecting the instrument to said laser source, said connecting means including a plurality of elongated conduit members having a longitudinal axis, articulatable joint means interconnecting said conduits and connecting the free ends of extreme conduits to said instrument and source so that the instrument is relatively freely movable to any desired point within three mutually perpendicular planes, reflective surface means and means mounting said surface means within each of said joints in a manner such that irrespective of adjacent conduit positioning the laser light beam will be reflected into the emergent conduit so that its axis of travel is substantially coincident with said longitudinal axis of said emergent conduit.

2. The system of claim 1 wherein the instrument distal end is tapered on opposed instrument sides to converge toward the focal point to define a hollow, blunt end, the angle of taper being a function of the optical system whereby the laser beam point focus will be substantially coincident with point of intersection of planes including the tapered surfaces.

3. The system of claim 1 also comprising a control means, said control means being carried by said instrument whereby operation of said laser generator may be remotely controlled.

4. The system of claim 1 also comprising a disposable shield, said shield being removably applied to said instrument so that said instrument is maintained in a condition of sterility.

5. A closed system capable of conducting efficiently a coherent and collimated laser light beam emanating from a laser generator adapted to be mounted on a ceiling through the spatial distance from the source to a patient whereby the laser light beam may be used in surgical applications comprising an instrument adapted to be held in the hand thereby to direct a focused laser beam, an optical system carried by said instrument for focusing the laser beam near the instrument end, and means connecting the instrument to said laser source, said connecting means including a pair of elongated cylindrical conduit members, one of said members being coaxially received within the other, bearing means between the outer and inner surface of respective conduits thereby providing both relative angular and longitudinal displacement, articulatable joint means connecting the free ends of extreme conduits to said instrument and source so that the instrument is relatively freely movable to any desired point within three mutually perpendicular planes, reflective surface means and means mounting said surface within each of said joint means in a manner such that irrespective of adjacent conduit positioning the laser light beam will be reflected into the emergent conduit so that its axis of travel is substantially coincident with said longitudinal axis of said emergent conduit.

6. The system of claim 5 wherein the instrument distal end is tapered on opposed instrument sides to converge toward the focal point to define a hollow, blunt end, the angle of taper being a function of the optical system whereby the laser beam point focus will be substantially coincident with point of intersection of planes including the tapered surfaces.

7. The system of claim 5 also comprising interacting stop means on said inner and outer longitudinally displaceable conduits to prevent motion of the former past both the fully extended and contracted positions.

8. The system of claim 5 also comprising resilient support means, said means being adapted to counterbalance the weight of the conduit members whereby the conduits will remain in an adjusted position.

9. A rotatable joint for use in a closed conduit system adapted to conduct efficiently a laser light beam from a laser generator to a remote focal plane to be used in surgical applications, said joint comprising a housing including a pair of concentric circular members adapted for relative angular motion and having an arcuate opening to the internal housing area, a conduit member connected at each opening, a reflector element, means for movably mounting said reflector within said housing so that irrespective of the relative position of said conduit members said reflector is positioned thereby to insure that the laser beam will be reflected into the emergent conduit and its axis of travel is substantially coincident with the axis of the emergent conduit, and means to limit the extent of relative angular movement of said conduits.

10. The rotatable joint of claim 9 wherein said means to movably mount said reflector includes a first leg connected at one end to the opposite side of said reflector and providing at the other end an elongated slot, means connected to each conduit member at points equidistant from the point of incidence of said beam on said reflecting surface providing a first and second pivot point, and link means pivotally connected at one end within said slot and at the other end to said first and second pivot points whereby any movement of the conduit members causes movement of said reflector so that the laser beam will be reflected along the axis of the conduit for the emerging ray.

11. In a laser beam conduit system for surgical use adapted to conduct a laser beam along a conduit having an articulatable joint, a light reflecting means, and means adapted to automatically reflect the entering ray of light substantially along the axis of the emergent conduit including the reflection of said entering ray of light through angles more acute and more obtuse than 90° to correspond with the angle being used between the entering ray and the emergent conduit.

12. In a surgical procedure employing laser energy the method steps of generating a laser beam in a laser generator, directing the beam along a substantially coaxial housing which is rotatable relative to the laser generator to provide rotatability in a first plane relative to the generator, deflecting the beam by substantially 90° into a second coaxial housing rotatable relative to the first housing to provide rotatability in a second plane perpendicular to said first plane, directing the beam along a coaxial housing which is both rotatable and slidably extendable whereby the extendable portion of the housing can be moved to any point within a three dimensional working region relative to a patient, and directing the beam through a scalpel-like laser-stylus having complete flexibility of attitude for handling by the surgeon by the additional steps of deflecting the beam through a rotatable housing at substantially 90° from the slidable and rotatable housing to provide rotatability in a plane perpendicular to the slidable-rotatable housing, and then deflecting the beam through another rotatable housing at 90° to the preceding deflector to provide rotatability in both planes perpendicular to the plane of the slidable-rotatable housing, and focusing the beam so that it emerges from the tapered tip of the stylus housing forming a concentrated beam of high intensity suitable for surgical use on a patient.

13. In a surgical procedure using laser energy, the method steps of generating a laser beam in a laser generator, directing the laser beam along an articulatable laser conduit system adapted to be movable to any desired location in a three dimensional working space relative to a patient, and additionally directing the laser beam through a laser stylus means having complete flexibility of attitude in the surgeon's hand by directing the beam along a path rotatable in three mutually perpendicular planes at said desired location relative to said laser generator and focusing the laser beam to a concentrated spot of intense energy suitable for surgical purposes.

14. In a laser beam conduit system for surgical use, a laser beam generator, articulatable laser conduit means adapted to conduct the laser beam to any location in a predetermined three dimensional work space relative to a patient, and laser-stylus means having freedom of attitude in three mutually perpendicular planes relative to said laser generator to facilitate manipulation, said laser-stylus means being connected to said generator by said conduit means.

15. A rotary joint for use in a closed conduit system adapted to conduct efficiently a laser light beam from a laser generator to a remote focal plane thereby to be used in surgical applications, said joint comprising a pair of cylindrical elbow conduits having their leg portions offset from one another by an angle of 90°, an element having a flat reflecting surface for reflecting a laser beam along the longitudinal axes of the elbow, means mounting said element so that its surface plane is at an angle of 45° relative to the longitudinal axes through the elbow and at the point intersection thereof, said mounting means comprising a spherical movable member, said elbow being configured complementary thereto thereby receiving said spherical member for rotation, said spherical member supporting said reflecting element on the side opposite said reflecting surface, means for moving said reflecting element to properly adjust said surface relative to the axis of the entering laser beam, means for locking the reflecting element in the adjusted position, and means for concentrically connecting one leg portion of each elbow so that the other leg portions are relatively freely rotatable about an axis which is coincident with the optical axis of the elbow.

PO-1050
(5/69)

UNITED STATES PATENT OFFICE
CERTIFICATE OF CORRECTION

Patent No. 3,528,424    Dated September 15, 1970

Inventor(s) Waldemar A. Ayres

It is certified that error appears in the above-identified patent and that said Letters Patent are hereby corrected as shown below:

Title page, column 1, after line 3, insert

--assignor to Becton, Dickinson and Company,

East Rutherford, New Jersey, a corporation of New Jersey.--

SIGNED AND
SEALED
MAR 9 1971

(SEAL)
Attest:

Edward M. Fletcher, Jr.
Attesting Officer

WILLIAM E. SCHUYLER, JR.
Commissioner of Patents